US011201807B2

United States Patent
Ishibashi et al.

(10) Patent No.: US 11,201,807 B2
(45) Date of Patent: Dec. 14, 2021

(54) TRAFFIC ESTIMATION APPARATUS, TRAFFIC ESTIMATION METHOD AND PROGRAM

(71) Applicant: Nippon Telegraph and Telephone Corporation, Tokyo (JP)

(72) Inventors: Keisuke Ishibashi, Tokyo (JP); Shigeaki Harada, Tokyo (JP); Ryoichi Kawahara, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/049,683

(22) PCT Filed: Mar. 28, 2019

(86) PCT No.: PCT/JP2019/013734
§ 371 (c)(1),
(2) Date: Oct. 22, 2020

(87) PCT Pub. No.: WO2019/208093
PCT Pub. Date: Oct. 31, 2019

(65) Prior Publication Data
US 2021/0243100 A1    Aug. 5, 2021

(30) Foreign Application Priority Data
Apr. 24, 2018 (JP) .............................. JP2018-083300

(51) Int. Cl.
*G06F 15/16* (2006.01)
*H04L 12/26* (2006.01)
(52) U.S. Cl.
CPC .......... *H04L 43/0876* (2013.01); *H04L 43/16* (2013.01)
(58) Field of Classification Search
CPC ...... H04L 12/16; H04L 43/0876; H04L 43/16
(Continued)

(56) References Cited

U.S. PATENT DOCUMENTS 6,442,615 B1 * 8/2002 Nordenstam ......... H04L 41/142
709/223
7,082,102 B1 * 7/2006 Wright ................ H04L 41/0893
370/229
(Continued)

FOREIGN PATENT DOCUMENTS

JP        5922825        5/2016

OTHER PUBLICATIONS

Berger et al., "Dimensioning Bandwidth for Elastic Traffic in High-Speed Data Networks," IEEE/ACM Transactions on Networking, 2000, 8(5):643-654.
(Continued)

*Primary Examiner* — Moustafa M Meky
*Assistant Examiner* — Thorne E Waugh
(74) *Attorney, Agent, or Firm* — Fish & Richardson P.C.

(57) ABSTRACT

A first time series of traffic volume and a first time series of communication quality that are observed in a first communication line in which traffic demand is equal to or greater than a line bandwidth and a second time series of traffic volume and a second time series of communication quality that are observed in a second communication line in which traffic demand is less than a line bandwidth are input to a state space model to estimate values of a parameter group of the state space model, the traffic demand is calculated based on the values of the parameter group, and the state space model is a state space model in which the first time series of traffic volume and the second time series of traffic volume are generated from a third time series indicating cyclicity of traffic common to the first communication line and the second communication line under influence of the first time series of communication quality and the second time series of communication quality on the traffic demand, thereby supporting appropriate band design of an overload line in (Continued)

which traffic demand is equal to or greater than a line bandwidth.

12 Claims, 2 Drawing Sheets

(58) Field of Classification Search
USPC .......................................................... 370/252
See application file for complete search history.

(56) References Cited

U.S. PATENT DOCUMENTS

| | | | | |
|---|---|---|---|---|
| 7,568,045 | B1* | 7/2009 | Agrawal | H04L 41/142 |
| | | | | 709/223 |
| 7,609,637 | B2* | 10/2009 | Doshi | H04L 47/825 |
| | | | | 370/235 |
| 8,045,562 | B2* | 10/2011 | Lee | H04L 41/0896 |
| | | | | 370/395.41 |
| 8,155,135 | B2* | 4/2012 | Aloni | H04L 49/9063 |
| | | | | 370/419 |
| 8,780,723 | B2* | 7/2014 | Matsuike | H04L 43/0894 |
| | | | | 370/236 |
| 8,995,249 | B1* | 3/2015 | Roy | H04Q 11/0066 |
| | | | | 370/216 |
| 9,087,319 | B2* | 7/2015 | Nguyen | H04L 12/14 |
| 10,211,922 | B2* | 2/2019 | Mutalik | H04Q 11/0067 |
| 10,326,532 | B2* | 6/2019 | Ashrafi | H04B 10/616 |
| 10,334,446 | B2* | 6/2019 | Ashrafi | H04L 43/08 |
| 10,637,782 | B2* | 4/2020 | Dillon | H04L 43/0852 |
| 10,749,807 | B2* | 8/2020 | Filley | H04L 47/127 |
| 2007/0195700 | A1* | 8/2007 | Katoh | H04L 41/5054 |
| | | | | 370/235 |
| 2008/0181125 | A1* | 7/2008 | Imai | H04L 43/0894 |
| | | | | 370/252 |
| 2015/0256619 | A1* | 9/2015 | Mihaly | H04L 67/36 |
| | | | | 709/217 |
| 2016/0134341 | A1* | 5/2016 | Agee | H04B 7/10 |
| | | | | 375/267 |
| 2016/0242088 | A1* | 8/2016 | Wang | H04L 47/29 |
| 2016/0285730 | A1* | 9/2016 | Ohkawa | H04L 43/16 |
| 2017/0339022 | A1* | 11/2017 | Hegde | G06N 3/0445 |

OTHER PUBLICATIONS

Bonald et al., "Dimensioning high speed IP access networks," Proc. ITC, 2003, Berlin, Germany, submitted Mar. 2, 2016, 11 pages.

Fredj et al., "Statistical Bandwidth Sharing: A Study of Congestion at Flow Level," ACM SIGCOMM, Aug. 27-31, 2001, pp. 111-122.

Kawahara et al., "A Method of Bandwidth Dimensioning and Management Using Flow Statistics*," IEICE Transactions on Communications, 2005, E88-B(2):643-653.

* cited by examiner

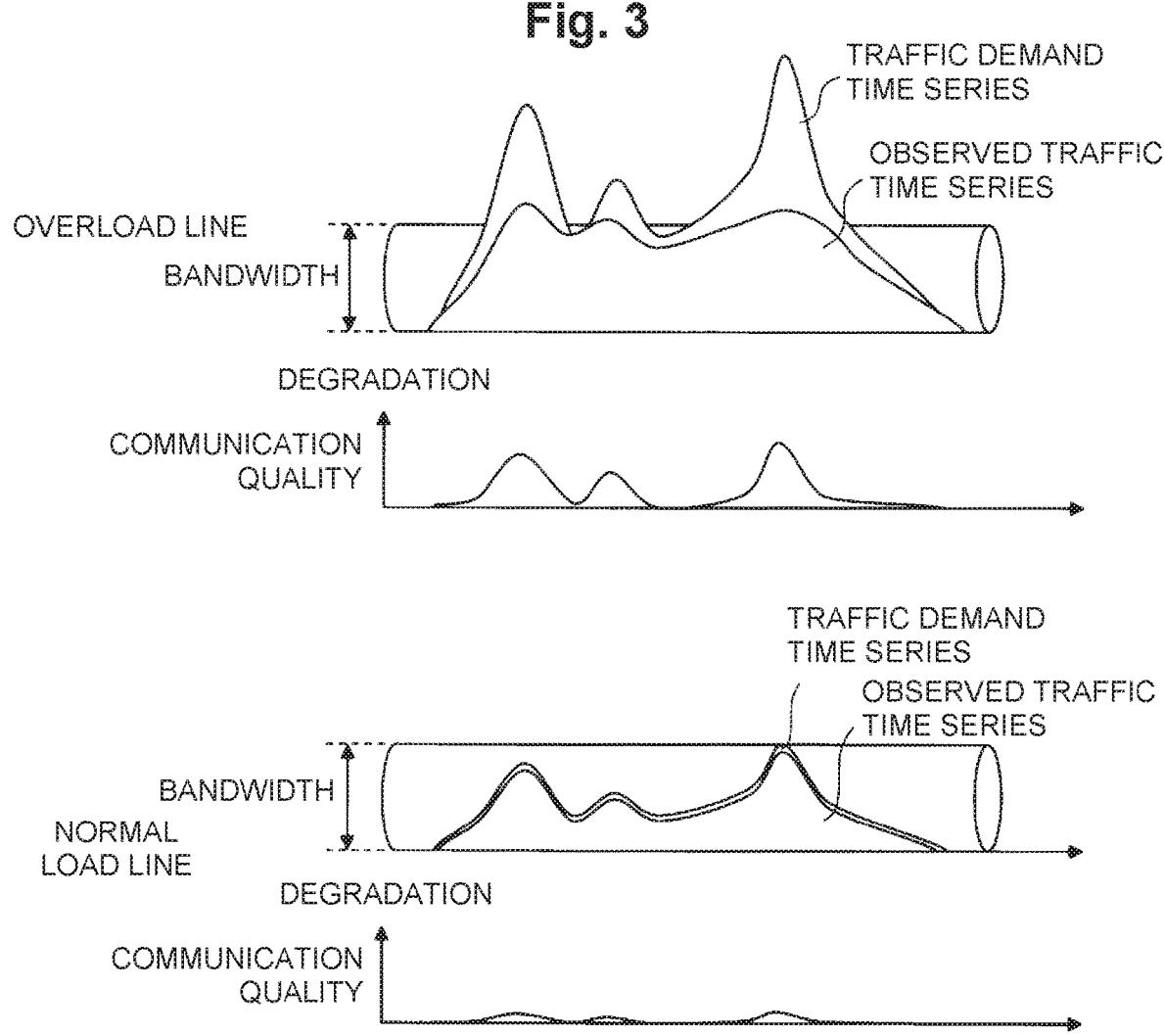

TRAFFIC ESTIMATION APPARATUS, TRAFFIC ESTIMATION METHOD AND PROGRAM

CROSS-REFERENCE TO RELATED APPLICATION

This application is a National Stage application under 35 U.S.C. § 371 of International Application No. PCT/JP2019/013734, having an International Filing Date of Mar. 28, 2019, which claims priority to Japanese Application Serial No. 2018-083300, filed on Apr. 24, 2018. The disclosure of the prior application is considered part of the disclosure of this application, and is incorporated in its entirety into this application.

TECHNICAL FIELD

The present invention relates to a traffic estimation device, a traffic estimation method, and a program.

BACKGROUND ART

In conventional band design of a network line, it has been common to calculate a predicted value of an input traffic volume to the line from an observed value of the input traffic volume, and to calculate a capacity that does not exceed a preset band utilization or achieves a desired communication quality even when the traffic volume of the predicted value is input. As the latter band design approach, there are an approach of calculating a required bandwidth using a packet delay time as communication quality, an approach of calculating a required bandwidth using a TCP flow transfer time and throughput as communication quality, and the like. As an example of the latter, Non-Patent Literature 1 proposes a band design approach that satisfies a target throughput using a closed queue network. Non-Patent Literature 2 proposes a band design approach that satisfies a target TCP throughput using a processor sharing model under the assumption that TCP shares a band fairly. Non-Patent Literature 3 proposes a band design approach that targets a relative value of a flow transfer time using measured flow statistics, again under the assumption of following the processor sharing model.

However, these approaches are intended for areas where the input traffic is less than a line bandwidth on average, and cannot be applied to an overload line in an overloaded state where the input traffic is equal to or greater than the line bandwidth over a long period of time. In such a situation, the input traffic may have decreased from the original traffic demand due to deterioration in communication quality. In such a case, if the bandwidth is increased, degradation in communication quality is resolved, and latent traffic may become apparent, so band design based on a predicted value of input traffic may be insufficient. Accordingly, in order to perform appropriate band design in the overloaded state, it is necessary to estimate a potential traffic demand when degradation in the communication quality has been resolved.

Non-Patent Literature 4 proposes a band design approach using modeling in which it is assumed that Internet use by a user is interrupted due to degradation in communication quality caused by the overloaded state, and flow transfer is interrupted when a flow transfer time, which is communication quality, has exceeded a threshold. However, the document only describes modeling and simulation, and does not verify the validity of the model.

Patent Literature 1 proposes a technique for estimating potential traffic in such an overloaded state. That is, Patent Literature 1 proposes an approach for comparing a time series of a feature amount, such as the number of users or the number of sessions, extracted from traffic data of a line in the overloaded state with a time series of the feature amount extracted from traffic data of a line not in the overloaded state, and correcting the former based on the latter to estimate traffic in the overloaded state.

CITATION LIST

Patent Literature

Patent Literature 1: Japanese Patent No. 5922825

Non-Patent Literature

Non-Patent Literature 1: A. W. Berger, and Y. Kogan, Dimensioning bandwidth for elastic traffic in high-speed data," IEEE/ACM Transactions on Networking, vol. 8, issue 5, pp. 643-654, October 2000.

Non-Patent Literature 2: T. Bonald, P. Olivier, J. Roberts, "Dimensioning high speed IP access networks," in Proc. ITC, 2003, Berlin, Germany. August 2003.

Non-Patent Literature 3: Ryoichi Kawahara, Keisuke Ishibashi, Takuya Asaka, and Takeo Abe, "A Method of Bandwidth Dimensioning and Management Using Flow Statistics," IEICE Transactions on Communications, Vol. E88-B, No. 2, pp. 643-653, February 2005.

Non-Patent Literature 4: S. B. Fredj, T. Bonald, A. Proutiere, G. Regnie, and J. W. Roberts, "Statistical bandwidth sharing: a study of congestion at flow level," ACM SIGCOMM 2001.

SUMMARY OF THE INVENTION

Technical Problem

However, since Patent Literature 1 directly compares those time-series data with each other, it is difficult to deal with noise on a cyclic pattern of the input traffic, which is remarkable in the Internet environment (e.g., a shift (fluctuation) in the input traffic on each day with respect to a fluctuation pattern in traffic at a cycle of one day (such a pattern that traffic is low in the morning and traffic increases in the evening).

The present invention has been made in view of the above points, and aims to support appropriate band design of an overload line in which traffic demand is equal to or greater than a line bandwidth.

Means for Solving the Problem

Therefore, in order to solve the above problem, a traffic estimation device has: an estimation unit that inputs, to a state space model, a first time series of traffic volume and a first time series of communication quality that are observed in a first communication line in which traffic demand is equal to or greater than a line bandwidth and a second time series of traffic volume and a second time series of communication quality that are observed in a second communication line in which traffic demand is less than a line bandwidth to estimate values of a parameter group of the state space model; and a calculation unit that calculates the traffic demand based on the values of the parameter group, wherein the state space model is a state space model in which the first time series of traffic volume and the second time series of traffic volume are generated from a third time series indicating cyclicity of traffic common to the first communication line and the second communication line under influence of the first time series of communication quality and the second time series of communication quality on the traffic demand.

Effects of the Invention

It is possible to support appropriate band design of an overload line in which traffic demand is equal to or greater than a line bandwidth.

BRIEF DESCRIPTION OF DRAWINGS

FIG. 3 is a diagram for explaining an overload line and a normal load line.

DETAILED DESCRIPTION OF THE INVENTION

Figure 1:
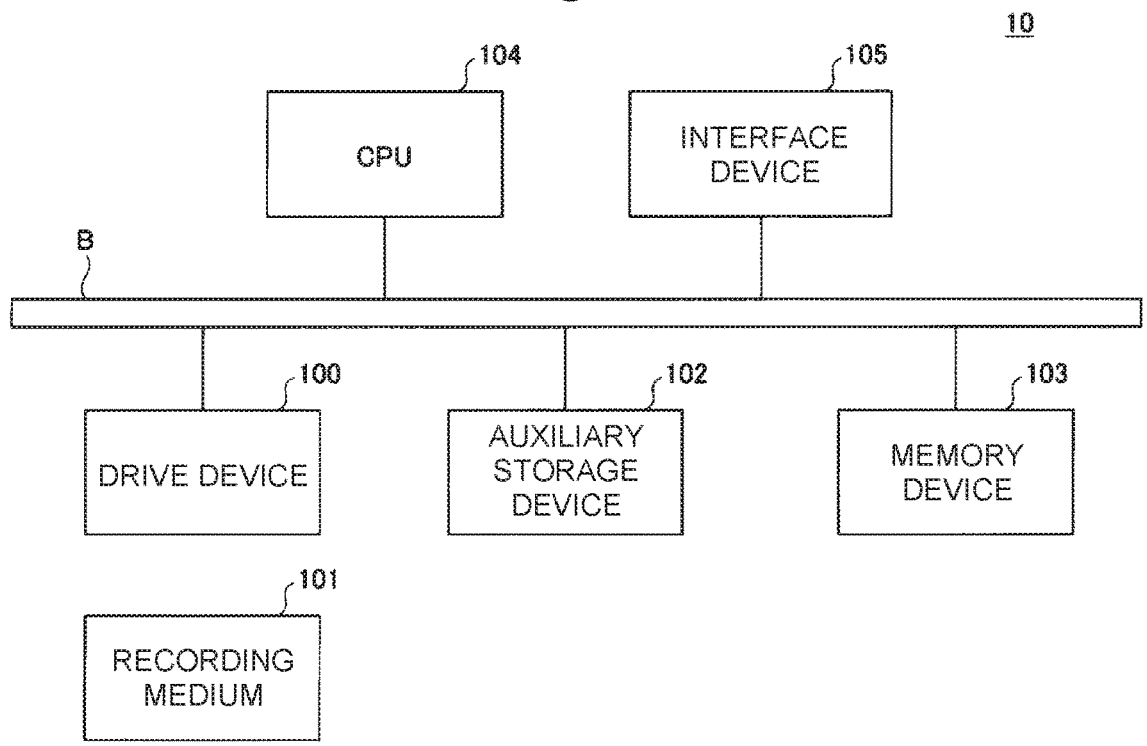
FIG. 1 is a diagram illustrating an example hardware configuration of a traffic estimation device 10 in a first embodiment.

Embodiments of the present invention will be described below based on the drawings. FIG. 1 is a diagram illustrating an example hardware configuration of the traffic estimation device 10 in the first embodiment. The traffic estimation device 10 has a drive device 100, an auxiliary storage device 102, a memory device 103, a CPU 104, an interface device 105, and the like, which are interconnected via a bus B.

A program for implementing the processing in the traffic estimation device 10 is provided through a recording medium 101 such as a CD-ROM. When the recording medium 101 storing the program is set in the drive device 100, the program is installed from the recording medium 101 to the auxiliary storage device 102 via the drive device 100. However, the program need not necessarily be installed from the recording medium 101, but may be downloaded from another computer via a network. The auxiliary storage device 102 stores the installed program as well as necessary files, data, and the like.

Upon an instruction to run the program, the memory device 103 reads the program from the auxiliary storage device 102 for storage. The CPU 104 executes functions related to the traffic estimation device 10 according to the program stored in the memory device 103. The interface device 105 is used as an interface for connecting to the network.

Figure 2:
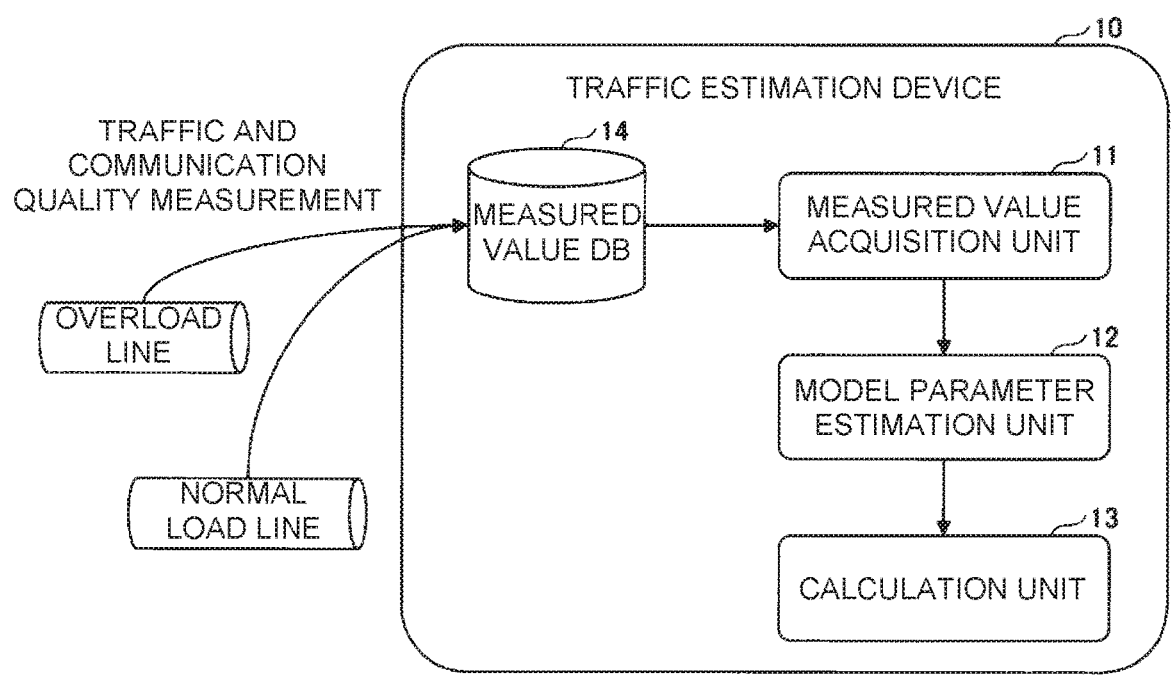
FIG. 2 is a diagram illustrating an example functional configuration of the traffic estimation device 10 in the first embodiment.

FIG. 2 is a diagram illustrating an example functional configuration of the traffic estimation device 10 in the first embodiment. In FIG. 2, the traffic estimation device 10 has a measured value acquisition unit 11, a model parameter estimation unit 12, and a calculation unit 13. Each of these units is implemented by a process that one or more programs installed in the traffic estimation device 10 cause the CPU 104 to execute. The traffic estimation device 10 also uses a measured value DB 14. The measured value DB 14 can be implemented using, for example, the auxiliary storage device 102, a storage device connectable to the traffic estimation device 10 via the network, or the like.

The measured value DB 14 stores time-series data of traffic volume (hereinafter referred to as an "observed traffic time series") and time-series data of communication quality (hereinafter referred to as a "communication quality time series") that are measured (observed) in advance for each of an overload line and a normal load line.

The observed traffic time series can be measured using an MIB (management information base) value at an apparatus interface for terminating each line, flow information such as NetFlow, or a method such as packet capturing for each line.

The communication quality time series can be measured by the same method as the observed traffic time series, or even by transmitting and receiving test packets or the like between apparatuses at both ends of each line or apparatuses on a path including both end points. For example, throughput, a delay time, a packet loss rate, and the like may be measured as communication quality.

FIG. 3 is a diagram for explaining the overload line and the normal load line. As shown in FIG. 3, the overload line is a line in which communication quality has degraded due to frequent occurrence of a state where traffic demand is equal to or greater than a line bandwidth over a long period of time (e.g., several hours or more), and the observed traffic time series has decreased due to influence of the degradation in communication quality (potential traffic demand is positive). Note that the traffic demand refers to a traffic volume including not only a traffic volume observed (observed traffic volume) but also a potential traffic volume (potential traffic demand). That is, in this embodiment, the traffic demand, the observed traffic volume, and the potential traffic demand have the following relationship:

$$\text{Traffic demand} = \text{Observed traffic volume} + \text{Potential traffic demand}$$

On the other hand, a normal load line refers to a line in which the communication quality has not degraded because the traffic demand is less than the line bandwidth, and the observed traffic is equal to the traffic demand (the potential traffic demand is 0).

Note that, for example, two lines that have line speeds different from each other but have the same traffic demand may be selected as the overload line and the normal load line. Alternatively, although their respective line speeds are the same, the traffic demands are different because the numbers of accommodated users are different, a communication line in which the traffic demand is less than the bandwidth is regarded as the normal load line, and a communication line in which the traffic demand is equal to or greater than the bandwidth may be selected as the overload line.

FIG. 2 is referred to again. The measured value acquisition unit 11 acquires the traffic time series and the communication quality time series in the overload line and the traffic time series and the communication quality time series in the normal load line for a predetermined period of time from the measured value DB 14. Note that a period of time longer than a fluctuation cycle of the traffic demand is preferable as the predetermined period of time. Here, the fluctuation cycle is one day if a similar fluctuation pattern is observed every day.

The model parameter estimation unit 12 estimates each value of a model parameter group by inputting (substituting) the observed traffic time series and the communication quality time series in the overload line and the observed traffic time series and the communication quality time series in the normal load line that are acquired by the measured value acquisition unit 11 to a state space model, an example of which is shown below. The model parameter group refers to the variables ($Z_t$, $Z_{t-1}$, $\alpha_o$, $\alpha_u$, $\Sigma$, $\beta$, $\Pi$) on the right side in Formula 2.

$$Z_t = FZ_{t-1} + V_t \quad \text{[Formula 1]}$$
$$T_t = GZ_t + \gamma L_t + W_t$$

$$F = \begin{pmatrix} 2 & -1 \\ 1 & 0 \end{pmatrix} \quad \text{[Formula 2]}$$

$$Z_t = \begin{pmatrix} Z_t \\ Z_{t-1} \end{pmatrix}$$

$$G = \begin{pmatrix} \alpha_o & 0 \\ \alpha_u & 0 \end{pmatrix}$$

$$V_t \sim \mathcal{N}(0, \Sigma)$$
$$W_t \sim \mathcal{N}(\beta, \Pi)$$

Here, $T_t$ is a two-dimensional vector in which the values of the observed traffic volume in the overload line and the observed traffic volume in the normal load line at a time t are arranged vertically. $L_t$ is a two-dimensional vector in which the communication quality of the overload line and the communication quality of the normal load line at the time t are arranged vertically. $N(0, \Sigma)$ is a two-dimensional normal distribution with a mean of 0 and a covariance matrix $\Sigma$ between $Z_t$ and $Z_{t-1}$. $N(\beta, \Pi)$ is a two-dimensional normal distribution with a mean $\beta$ and a covariance matrix $\Pi$ between the observed traffic volume in the overload line at the time t and the observed traffic volume in the normal load line at the time t. Since $N(0, \Sigma)$ and $N(\beta, \Pi)$ are normal distributions in Formulas 1 and 2, giving a value to each parameter results in a probability distribution with $T_t$ and $L_t$ as random variables. When $T_t$ and $L_t$ are specified for the probability distribution, a probability is obtained. As an example of a method for estimating the value of each model parameter, the model parameter estimation unit 12 may estimate a value that maximizes the probability as a maximum likelihood value. Note that in the model parameter group, $\gamma$ is a parameter indicating the magnitude of influence of the communication quality on (the magnitude of) the potential traffic demand (hereinafter referred to as a "degree of influence"). Accordingly, the degree of influence is estimated by the model parameter estimation unit 12.

$Z_t$ is a traffic trend time-series pattern that is common to the overload line and the normal load line. The traffic trend time-series pattern refers to a pattern indicating cyclicity of traffic (e.g., cyclicity such that it is lower in the morning hours and higher in the evening hours). $\alpha_0$ and $\alpha_u$, which are elements in the matrix G, are scale parameters for converting the traffic trend time-series pattern $Z_t$ into time series of the traffic demands (i.e., potential traffic demand+observed traffic volume) in the overload line and the normal load line, respectively. These scale parameters are introduced to indicate a time-invariant traffic ratio between the respective lines, and are estimated as, for example, values proportional to the numbers of accommodated users in the respective line. In this embodiment, the degree of influence is considered not based on $T_t$ including noise on the traffic trend time-series pattern $Z_t$ (fluctuation in traffic volume for each cycle (e.g., each day)) but based on the traffic trend time-series pattern $Z_t$ from which the noise is removed, thereby making it possible to deal with the noise.

Expanding Formula 1 using F in Formula 2 results in $(Z_{t-1}-Z_t)-(Z_{t-2}-Z_{t-1})=V_t$. This means that the time series obtained by taking the second-order difference of the traffic trend time-series pattern $Z_t$ follows a normal distribution with a mean of 0. Since it is easy to extend the second order to the k-th order (an integer of k≥1), Formulas 1 and 2 mean that a time series obtained by taking the k-th order difference of the traffic trend time-series pattern $Z_t$ follows a normal distribution with a mean of 0.

The degree of influence of the communication quality time series in each communication line is modeled by a regression model ($\gamma L_t$) with the communication quality time series as an explanatory variable and with a difference between the observed traffic time series and the traffic trend time-series pattern $Z_t$ as an objective variable. That is, $L_t$ in Formula 1 is the explanatory variable, and $\gamma$ is a regression coefficient.

That is, Formulas 1 and 2 above represent a state space model in which the observed traffic time series in the overload line and the observed traffic time series in the normal load line are generated from the traffic trend time-series pattern $Z_t$ under the influence of the communication quality time series in each of the overload line and the normal load line on the traffic demand (the traffic demand in each of the overload line and the normal load line).

Note that the model in Non-Patent Literature 4 is a model in which individual user communications are subject to (deterministic) influence, while this embodiment uses a model in which the total link traffic volume obtained by aggregating them is subject to influence represented by the parameter $\gamma$.

In addition, in the model in Non-Patent Literature 4, the influence of degradation in communication quality is deterministic, while this embodiment is an approach of estimating the influence using parameters, so that flexibility is secured.

The calculation unit 13 calculates the potential traffic demand at a time t based on G, $Z_t$ and $\beta$ among the values of the model parameters estimated by the model parameter estimation unit 12. Specifically, the calculation unit 13 calculates "$GZ_t+\beta$–the observed traffic volume in the overload line at the time t" as the potential traffic demand in the overload line at the time t. In other words, the calculation unit 13 calculates $GZ_t+\beta$ as the traffic demand in the overload line at the time t.

As described above, according to this embodiment, it is made possible to estimate the potential traffic demand in the overload line in which the traffic demand is equal to or greater than the line bandwidth. As a result, it is possible to support appropriate band design for the overload line.

In the conventional techniques, the influence on the traffic demand due to degradation in the communication quality is not considered, and it is difficult to estimate the degree of the influence, but according to this embodiment, the magnitude of the influence (degree of influence) of the communication quality on the traffic demand can also be estimated. By quantitatively grasping the influence of the communication quality, an effect of improving the communication quality can be expected.

Next, a second embodiment will be described. In the second embodiment, different points from the first embodiment will be described. Points that are not particularly mentioned in the second embodiment may be the same as those in the first embodiment.

In the second embodiment, the example of the state space model is replaced with Formula 3 below from Formula 1:

$$Z_t = FZ_{t-1} + V_t$$

$$T_t = GZ_t \times \exp(-\gamma L_t) + W_t \quad \text{[Formula 3]}$$

The model in Formula 1 is a model assuming that the communication quality linearly/additively affects a decrease in the traffic demand, while the model in Formula 3 is a model assuming that the communication quality exponentially/multiplicatively affects a decrease in the traffic demand.

In the second embodiment, the calculation unit 13 uses $GZ_t$ and $\beta$ in Formula 3 to calculate "$GZ_t+\beta$—the observed traffic volume in the overload line at the time t" as the potential traffic demand in the overload line at the time t. In other words, the calculation unit 13 calculates $GZ_t+\beta$ as the traffic demand in the overload line at the time t.

Note that in each of the above embodiments, the overload line is an example of the first communication line. The normal load line is an example of the second communication line. The observed traffic time series in the overload line is an example of the first time series of traffic volume. The communication quality time series in the overload line is an example of the first time series of communication quality. The observed traffic time series in the normal load line is an example of the second time series of traffic volume. The communication quality time series in the normal load line is an example of the second time series of communication quality. The traffic trend time-series pattern $Z_t$ is an example of the third time series. The model parameter estimation unit 12 is an example of the estimation unit.

Although the embodiments of the present invention have been described above in detail, the present invention is not limited to such specific embodiments, and various variants and modifications are possible within the gist of the present invention described in Claims.

REFERENCE SIGNS LIST

10 Traffic estimation device
11 Measured value acquisition unit
12 Model parameter estimation unit
13 Calculation unit
14 Measured value DB
100 Drive device
101 Recording medium
102 Auxiliary storage device
103 Memory device
104 CPU
105 Interface device
B Bus

The invention claimed is:

1. A traffic estimation device comprising:
   an estimation unit, including one or more processors, that inputs, to a state space model, a first time series of traffic volume and a first time series of communication quality that are observed in a first communication line in which traffic demand is equal to or greater than a line bandwidth and a second time series of traffic volume and a second time series of communication quality that are observed in a second communication line in which traffic demand is less than a line bandwidth to estimate values of a parameter group of the state space model; and
   a calculation unit, including one or more processors, that calculates the traffic demand based on the values of the parameter group, wherein
   the state space model is a state space model in which the first time series of traffic volume and the second time series of traffic volume are generated from a third time series indicating cyclicity of traffic common to the first communication line and the second communication line under influence of the first time series of communication quality and the second time series of communication quality on the traffic demand.

2. The traffic estimation device according to claim 1, wherein
   the parameter group includes a parameter indicating magnitude of the influence.

3. The traffic estimation device according to claim 1, wherein
   a time series obtained by taking a k-th order difference (an integer of k≥1) of the third time series follows a normal distribution with a mean of 0.

4. The traffic estimation device according to claim 1, wherein:
   the influence is modeled by a regression model with the first time series of communication quality and the second time series of communication quality as an explanatory variable, and with differences between the first time series of traffic volume and the second time series of traffic volume and the third time series as an objective variable.

5. A traffic estimation method executed by a computer, the traffic estimation method comprising:
   an estimation step of inputting, to a state space model, a first time series of traffic volume and a first time series of communication quality that are observed in a first communication line in which traffic demand is equal to or greater than a line bandwidth and a second time series of traffic volume and a second time series of communication quality that are observed in a second communication line in which traffic demand is less than a line bandwidth to estimate values of a parameter group of the state space model; and
   a calculation step of calculating the traffic demand based on the values of the parameter group, and wherein
   the state space model is a state space model in which the first time series of traffic volume and the second time series of traffic volume are generated from a third time series indicating cyclicity of traffic common to the first communication line and the second communication line under influence of the first time series of communication quality and the second time series of communication quality on the traffic demand.

6. The traffic estimation method according to claim 5, wherein
   the parameter group includes a parameter indicating magnitude of the influence.

7. The traffic estimation method according to claim 5, wherein
   a time series obtained by taking a k-th order difference (an integer of k≥1) of the third time series follows a normal distribution with a mean of 0.

8. The traffic estimation method according to claim 5, wherein:
   the influence is modeled by a regression model with the first time series of communication quality and the second time series of communication quality as an explanatory variable, and with differences between the first time series of traffic volume and the second time series of traffic volume and the third time series as an objective variable.

9. A non-transitory computer readable medium storing one or more instructions causing a computer to execute:
   an estimation step of inputting, to a state space model, a first time series of traffic volume and a first time series of communication quality that are observed in a first communication line in which traffic demand is equal to or greater than a line bandwidth and a second time series of traffic volume and a second time series of communication quality that are observed in a second communication line in which traffic demand is less than a line bandwidth to estimate values of a parameter group of the state space model; and a calculation step of calculating the traffic demand based on the values of the parameter group, and wherein the state space model is a state space model in which the first time series of traffic volume and the second time series of traffic volume are generated from a third time series indicating cyclicity of traffic common to the first communication line and the second communication line under influence of the first time series of communication quality and the second time series of communication quality on the traffic demand.

10. The non-transitory computer readable medium according to claim 9, wherein the parameter group includes a parameter indicating magnitude of the influence.

11. The non-transitory computer readable medium according to claim 9, wherein a time series obtained by taking a k-th order difference (an integer of $k \geq 1$) of the third time series follows a normal distribution with a mean of 0.

12. The non-transitory computer readable medium according to claim 9, wherein:

the influence is modeled by a regression model with the first time series of communication quality and the second time series of communication quality as an explanatory variable, and with differences between the first time series of traffic volume and the second time series of traffic volume and the third time series as an objective variable.

* * * * *